3,640,929
CHRYSOTILE ASBESTOS FIBER REINFORCED POLYMERS OF PROPYLENE
Thomas W. Darling, Rochdale, England, assignor to Turner Brothers Asbestos Company Limited, Manchester, England
No Drawing. Filed Oct. 10, 1968, Ser. No. 766,621
Claims priority, application Great Britain, Oct. 12, 1967, 46,668/67
Int. Cl. C08f 29/02, 45/60
U.S. Cl. 260—23 H        8 Claims

ABSTRACT OF THE DISCLOSURE

Polypropylene or copolymers of propylene reinforced with chrysotile asbestos and containing an antioxidant system comprising one or more compounds containing the group

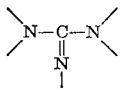

and a phenolic compound show greatly improved oxidation resistance. Oxidation resistance may be further increased by the addition of certain sulphur compounds, and by suitable pretreatment of the asbestos fiber prior to compounding.

---

The incorporation of fibrous reinforcement into thermoplastic resin compositions gives improved mechanical properties, dimensional stability and heat resistance as well as increasing the strength of the product. The fibrous reinforcement may be organic or inorganic in nature, but is most frequently inorganic; asbestos or glass fibers are commonly used.

However, it has been found that the incorporation of asbestos reinforcing fibers into polypropylene considerably reduces the oxidation resistance of the polymer, and this effect is especially noticeable with chrysotile asbestos. The only way up to the present in which it has been possible to fill polypropylene with asbestos and yet retain adequate oxidation resistance of the product has been to compound together, for example on a rubber mill, the polymer, anthophyllite asbestos and an inhibitor or mixture of inhibitors to protect the product against oxidative degradation; varieties of asbestos other than anthophyllite have not yielded satisfactory products.

Anthophyllite fiber is normally heavily contaminated with mica and talc and is not easily purified. Chrysotile fiber, on the other hand, is a clean fiber which is readily obtainable in a pure state. Furthermore, chrysotile is a much stronger fiber than anthophyllite, and has a smaller fiber diameter, so that it is more flexible; it is also obtainable in a wider range of lengths and surface areas than anthophyllite. All these facts indicate that it would be eminently preferable to fill polypropylene with chrysotile asbestos rather than with anthophyllite asbestos if a way could be found of retaining adequate oxidation resistance of the product.

Commercially available grades of polypropylene and copolymers of propylene already contain an unspecified quantity of antioxidant, believed to be a phenolic type antioxidant. Some increase in the oxidation resistance of chrysotile asbestos-filled polypropylene can be obtained solely by incorporating further phenolic antioxidant, for example up to 5% of antioxidant, but the life of the filled polypropylene at high temperatures is still not good, and there are attendant drawbacks involved such as discolouration and reduction in processability and mechanical properties, as well as increased cost.

According to our invention, we compound polypropylene or copolymers of propylene with chrysotile asbestos and an antioxidant system comprising one or more compounds containing the group

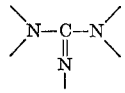

and a phenolic compound; using the antioxidant system according to the invention, we can process the filled polypropylene and obtain products with greatly improved oxidation resistance. The invention also specifically includes as new composition of matter, homopolymers or copolymers of propylene filled with chrystile asbestos fiber and containing an antioxidant system comprising one or more compounds containing the group

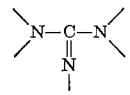

and a phenolic compound.

The methods used to mix asbestos fibers and polymers generally involve the use of the polymers in powdered form, dry preblends of fiber and polymer then being made by tumbling, blending or ball milling techniques which do not cause fiber degradation. Polypropylene is freely available in powder form and is therefore particularly suited to such preblending techniques, and the antioxidant system can be added to the polypropylene and asbestos fiber in this preblending stage, as well as any other desired additives. The preblend is then compounded in a suitable mixer, and may be formed into pellets, for example for injection moulding, or extrusion.

Examples of compounds containing the group

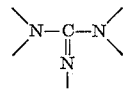

are dicyandiamide, melamine, guanidine and their derivatives. Melamine is the preferred compound because of its stability to heat; the other compounds may tend to decompose and/or volatilise at the upper end of the range of temperatures used for processing polypropylene. It is usually desirable to incorporate from 0.5 to 5%, and preferably from 2 to 3% by weight of one or more of these compounds calculated on the asbestos content of the filled polypropylene.

The second component of the antioxidant system is preferably a compound having low volatility. Compounds which have proved satisfactory are those sold under the trademarks Wingstay L (described as a polymeric hindered phenol), Topanol CA (described as a high molecular weight phenolic compound) and Santowhite (4,4' butylidene bis 6-t-butyl m-cresol), as well as other bisphenol type antioxidants, for example 4,4' methylene bis (2.6 di-t-butyl phenol). Wingstay L and Topanol CA have been found to be particularly suitable. A minimum of about 0.5% by weight calculated on the polypropylene will commonly be required, although additions of as little as 0.1% may be suitable in some cases, and more than 2.5% is generally unnecessary.

Some organic sulphur compounds are known to act synergistically with phenolic antioxidants and examples of these are dilauryl 3,3' thiodipropionate (DLTP) and distearyl 3,3' thiodipropionate. Such sulphur-containing compounds may be added with advantage to the antioxidant system. When such compounds are included, we prefer to use from 0.25 to 1% by weight calculated on the polypropylene and more preferably from 0.5 to 0.75%; the content of phenolic compound may then be reduced, and is advantageously the same as that of the sulphur-containing compound.

Examples of suitable polypropylene and copolymers of propylene are those sold under the trademarks Propathene GW522M, LY 542M, GW 601M and GY702M, these materials containing unspecified quantities of antioxidants and inhibitors.

To produce moulding compounds with good flow properties, the shorter grades of asbestos fibers are used, up to and including grade 4 of the Canadian classification. The preferred fiber is that sold under the trademark Cassiar AY, a Canadian crude of length intermediate between grades 5 and 6 and having a surface area (Rigden air permeability) of 80 to 120 dm.²/gm.

Other Canadian, Rhodesian, Cyprus and South African fibers of 4ˢ, 5ˢ, 6ˢ, and 7ˢ grade (Canadian classifications) with surface areas measured by the Rigden air permeability method of from 20 dm.²/gm. to 400 dm.²/gm. are also suitable. In some cases it is advantageous to use cleaned and mechanically opened chrysotile asbestos fibers to improve the homogeneity of the compounds and to yield improved flow properties and surface finish of mouldings.

Conventional fillers and pigments or dyes may be included in the mix if desired. Examples of fillers are talc, french chalk, slate flour, pyrites and silica.

The results of tests on various compositions will now be given. The asbestos in each composition was Cassiar AY, the asbestos content of the filled product 40% by weight, and the polypropylene used was that sold under the trademark "Propathene" GW 522 M, a homopolymer containing an unspecified content of antioxidant.

The polypropylene, asbestos and additives were pre-blended, compounded in a laboratory mixer, and then moulded at 260° C. into plaques 1/16 inch thick. These plaques were then subjected to a simple oven ageing test at 150° C. to determine their oxidation resistance, any plaque being deemed to have failed when crazing, that is to say a network of cracks on its surface, becomes visible.

The following results were obtained:

| Composition | Antioxidant system | Oven test: time to failure at 150° C. (hours) |
|---|---|---|
| A | None | 10 |
| B | 0.9% Melamine | 20 |
| C | 0.6% Wingstay L | 60 |
| D | 0.4% Wingstay L; 0.4% DLTP | 80 |
| E | 0.9% Melamine; 0.6% Wingstay L | 232 |
| F | 0.9% Melamine; 0.4% Wingstay L; 0.4% DLTP | 256 |

The superiority of the compositions according to the invention can readily be seen.

According to a further feature of our invention, the oxidation resistance of the filled polypropylene may be increased still further if the chrysotile asbestos fiber is suitably pretreated before compounding. Asbestos fiber is believed to have what may be called active sites on its surface, that is to say sites which are capable of reaction with other compounds, or which may show catalytic activity in the breakdown of other materials. In the case of chrysotile asbestos, it is believed that these sites may be in the form of magnesium hydroxide. We have developed a number of pretreatments for asbestos fibers in general, and for chrysotile asbestos fibers in particular, which are aimed at deactivating in some way these active sites. Pretreatments which have this effect include:

(1) Precipitation of an isoluble inorganic soap, e.g. calcium stearate, on the fiber. This may be done by dispersing the fiber in, say, sodium stearate solution and then adding calcium chloride.

(2) Treating the fiber with a solution of a silicone fluid, for example that sold under the trademark MS 1107.

(3) Treating the fiber with a solution of an isocyanate, for example of toluene diisocyanate.

(4) Treating the fiber with an organic silicate, e.g. ethyl silicate, or isopropyl silicate.

(5) Treating the fiber with a subsituted chlorosilane in the vapour phase.

(6) Treating the fiber with a substituted alkoxy silane, either in the vapour phase or in solution.

By way of example, a chrysotile asbestos-filled polypropylene plaque containing an antioxidant system according to the invention and fiber which had been pretreated with 2.5% calcium stearate was found to have a time-to-failure at 150° C. which was 70 hours longer than that of a similar plaque formed from un-pretreated asbestos. In another test, the fiber was pretreated with MS 1107 and a similar increase in time-to-failure was obtained.

What is claimed is:

1. In a filled polymeric composition comprising homopolymers and copolymers of polypropylene filled with asbestos fibers and containing an anti-oxidant system comprising from 0.1 to 2.5% by weight based on the propylene content of an organic phenolic compound, the improvement characterized by said fibers being chrysotile asbestos fibers and said anti-oxidant system containing additionally from 0.5 to 5% by weight based on the asbestos content of at least one organic nitrogen-containing compound containing the group

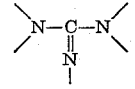

and selected from the group consisting of dicyandiamide, melamine, guanidine and derivatives thereof.

2. The composition of claim 1, wherein said nitrogen-containing compound is present at a level of from 2 to 3% by weight.

3. The composition of claim 1, wherein said phenolic compound is present at a level of from 0.5 to 2.5% by weight.

4. The composition of claim 1, wherein said asbestos fiber is a pretreated fiber, said pretreatment being by precipitation thereon of an insoluble soap.

5. The composition of claim 1, wherein said asbestos fiber is a pretreated fiber, said pretreatment being by treating said fiber with a silicone fluid.

6. The composition of claim 1, wherein said antioxidant system contains additionally an organic sulfur compound at a level of from 0.5 to 0.75% by weight based on the propylene content, said sulfur compound acting synergistically with said organic phenolic compound and being selected from the group consisting of dilauryl 3,3'-thiodipropionate and distearyl 3,3'-thiodipropionate.

7. The composition of claim 6, wherein said asbestos fiber is a pretreated fiber, said pretreatment being by precipitation thereon of an insoluble soap.

8. The composition of claim 6, wherein said asbestos fiber is a pretreated fiber, said pretreatment being by treating said fiber with a silicone fluid.

References Cited

UNITED STATES PATENTS

| 3,084,135 | 4/1963 | Scullin | 260—41 |
| 3,181,971 | 5/1965 | Rayner | 117—232 |
| 3,357,945 | 12/1967 | Seger | 260—45.85 |
| 3,472,805 | 10/1969 | Marinaccio et al. | 260—23 |
| 3,484,402 | 12/1969 | Drake et al. | 260—23 |

FOREIGN PATENTS

| 1,009,783 | 11/1965 | Great Britain | 260—41 |

DONALD E. CZAJA, Primary Examiner

R. W. GRIFFIN, Assistant Examiner

U.S. Cl. X.R.

260—41 R, 41 A, 45.8 N, 45.85, 45.9